(12) United States Patent
Arel

(10) Patent No.: US 7,871,035 B2
(45) Date of Patent: Jan. 18, 2011

(54) PROPULSION SYSTEM FOR AN AIRSHIP OR HYBRID AIRCRAFT

(75) Inventor: David V. Arel, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1154 days.

(21) Appl. No.: 11/786,158

(22) Filed: Apr. 11, 2007

(65) Prior Publication Data

US 2009/0072082 A1    Mar. 19, 2009

(51) Int. Cl.
*B64B 1/62* (2006.01)
(52) U.S. Cl. .............................. 244/98; 244/66; 244/56; 244/30
(58) Field of Classification Search .................. 244/98, 244/66, 56, 30, 96, 97, 12.4, 24–29
See application file for complete search history.

(56) References Cited

U.S. PATENT DOCUMENTS

| | | | |
|---|---|---|---|
| 3,614,034 A * | 10/1971 | Townsend | 244/56 |
| 4,204,656 A | 5/1980 | Seward, III | |
| 4,891,029 A * | 1/1990 | Hutchinson | 446/58 |
| 5,096,141 A * | 3/1992 | Schley | 244/25 |
| 5,333,817 A * | 8/1994 | Kalisz et al. | 244/97 |
| 5,368,256 A * | 11/1994 | Kalisz et al. | 244/26 |
| 5,383,627 A * | 1/1995 | Bundo | 244/26 |
| 5,538,203 A * | 7/1996 | Mellady | 244/97 |
| 2008/0011899 A1* | 1/2008 | Amit | 244/12.4 |

* cited by examiner

*Primary Examiner*—Christopher P Ellis
(74) *Attorney, Agent, or Firm*—Kinney & Lange, P.A.

(57) ABSTRACT

A propulsion system for an airship or hybrid aircraft includes a propeller and a pivot mechanism connected to the propeller. The pivot mechanism enables the propeller to pivot around a first pivot axis between a maneuver thruster position and an emergency ballonet fill position. Under normal conditions, when the propulsion system is disposed in the maneuver thruster position, the pivot mechanism also enables the propeller to pivot around a second pivot axis to control the attitude and thrust of the vehicle. However, in an emergency descent situation, the propeller may be rotated to the emergency ballonet fill position.

20 Claims, 9 Drawing Sheets

PROPULSION SYSTEM FOR AN AIRSHIP OR HYBRID AIRCRAFT

BACKGROUND

The present invention relates to a propulsion system for an airship or hybrid aircraft. More specifically, the present invention relates to a propulsion system which is capable of functioning as both a maneuver thruster and as an emergency ballonet fan for an airship or hybrid aircraft.

An airship is a buoyant vehicle, which can be propelled and steered through the air. Airships stay aloft primarily by means of a large cavity, enclosed by a balloon or envelope, which is filled with a lighter-than-air gas, such as helium. Since the airship is lighter than the air it displaces, it floats. A hybrid aircraft also includes an envelope and attains partial buoyancy from a lighter-than-air gas. However, a hybrid aircraft is heavier than air and is shaped like a wing. In addition to the lighter-than-air gas, a hybrid aircraft gets lift from aerodynamic flow over the envelope. Therefore, a hybrid aircraft has attributes of both an airship and an aircraft, such as an airplane.

The envelope of both an airship and a hybrid aircraft includes a number of air sacs or ballonets, which are used to control the buoyancy of the vehicle and maintain the shape of the envelope in response to expansion of the lighter-than-air gas due to changes in altitude or pressure. The ballonets are periodically filled with "heavy" air by ballonet fans. To begin the airship or hybrid aircraft's ascent, air is vented from the ballonets increasing the vehicle's buoyancy. As the vehicle rises, the ambient air pressure decreases, which causes the contained lighter-than-air gas to expand and maintain the size and shape of the envelope.

When the airship or hybrid aircraft is airborne, a propulsion system is used to control vehicle attitude and provide thrust. The propulsion system is comprised of a number of maneuver thrusters mounted outside of the envelope. Each maneuver thruster includes a propeller, which is powered by a motor, and a cowl, which encases and protects the propeller. In order to balance the pressure inside the envelope while in flight, air may be periodically pumped into and vented out of the ballonets to keep the vehicle neutrally buoyant in response to pressure and altitude changes. To descend, the ballonets are filled with air via the ballonet fans to increase the density of the vehicle. During descent, the ambient air pressure once again increases and additional air may be blown into the ballonets, thus providing the requisite pressure within the envelope.

As the airship or hybrid aircraft increases or decreases in altitude, it is important to maintain balance between the ambient air pressure and the pressure of the lighter-than-air gas inside the envelope. If the appropriate air pressure within the envelope is not maintained, a catastrophe can result. For instance, if the vehicle experiences some type of mechanical failure and begins to descend rapidly, the ambient air pressure will increase too quickly causing the envelope to collapse, which may result in structural damage. If this occurs, the airship or hybrid aircraft will essentially fall from the sky.

Various airworthiness authorities have specific requirements which address this type of emergency descent situation. In order to maintain the structural integrity of the envelope in this rare situation, these authorities mandate that every airship or hybrid aircraft has the ability to pump air into the ballonets at a high flow rate. In an effort to meet this requirement, current designs for airships or hybrid aircrafts include a number of emergency ballonet fans (in addition to the ballonet fans that operate under normal conditions), which are capable of pumping air into the ballonets very quickly. Thus, the emergency ballonet fans serve the sole purpose of rapidly inflating the ballonets in the event of an emergency descent situation and are several times larger and heavier than the ballonet fans needed for normal operation. The need to have these additional ballonet fans for use only in an emergency is costly and also results in an increase in the total weight of the vehicle.

Therefore, it would be useful in the art to provide a propulsion system that controls vehicle attitude and provides forward thrust under normal conditions and is capable of performing the function of emergency ballonet fans in an emergency descent situation.

SUMMARY

The present invention is a propulsion system for an airship or hybrid aircraft. The propulsion system includes a propeller and a pivot mechanism connected to the propeller. The pivot mechanism enables the propeller to pivot around a first pivot axis between a maneuver thruster position and an emergency ballonet fill position. Under normal conditions, when the propulsion system is disposed in the maneuver thruster position, the pivot mechanism also enables the propeller to pivot around a second pivot axis to control the attitude and thrust of the vehicle. However, in an emergency descent situation, the propeller may be rotated to the emergency ballonet fill position.

DETAILED DESCRIPTION

Figure 1:
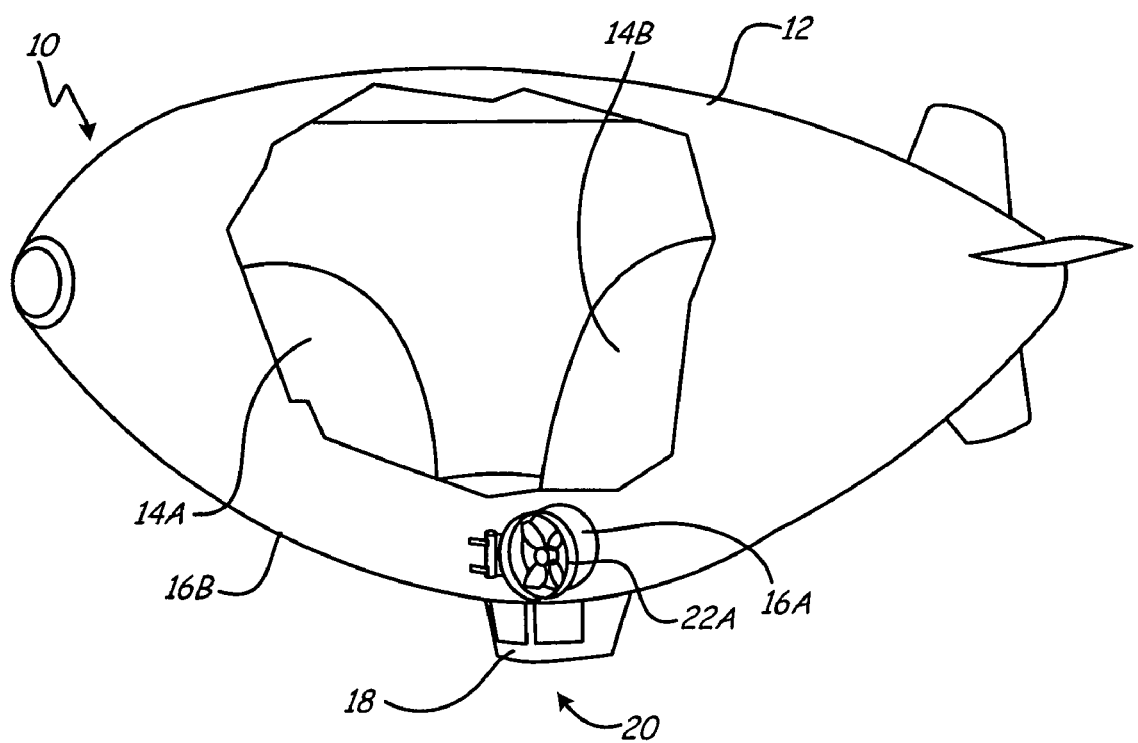
FIG. 1 is a perspective view of an exemplary embodiment of an airship.

FIG. 1 is a perspective view of airship 10. Airship 10 is comprised of envelope 12, forward ballonet 14A, aft ballonet 14B, forward air valve 16A, aft air valve 16B and gondola 18. Also included is propulsion system 20, which comprises maneuver thrusters 22A and 22B.

Airship 10 is an example of a non-rigid airship because it utilizes a pressure level in excess of the surrounding air pressure to retain the shape of envelope 12. Envelope 12 is a large bag comprised of a durable, lightweight material, which contains a lighter-than-air gas, such as helium. The overall configuration of envelope 12 is generally cigar-shaped for aerodynamic purposes. In order to control the pressure within envelope 12 and the buoyancy of airship 10, envelope 12 includes two air-filled sacs or ballonets 14A and 14B within its cavity. However, in other embodiments airship 10 may be designed to include a single ballonet or additional ballonets.

In the exemplary embodiment shown in FIG. 1, forward ballonet 14A is positioned at a fore location and aft ballonet 14B is positioned at an aft location. Forward and aft ballonets 14A and 14B are filled with air, which is heavier than the lighter-than-air gas contained within envelope 12. The amount of air forward and aft ballonets 14A and 14B contain is controlled via forward air valve 16A and aft air valve 16B, which are located on an outer side of envelope 12 and regulate air flow into and out of forward ballonet 14A and aft ballonet 14B, respectively. To facilitate ascent, "heavy" air is vented from forward and aft ballonets 14A and 14B to increase the buoyancy of airship 10. As airship 10 rises and the size of forward and aft ballonets 14A and 14B decreases, the shape of envelope 12 is maintained due to a decrease in ambient air pressure, which results in an expansion of the lighter-than-air gas. Therefore, the increase in internal pressure is linked to the increase in buoyancy during ascent. While in flight, air can be pumped into or vented out of forward and aft ballonets 14A and 14B as needed in response to ongoing temperature and pressure changes to control the enclosed volume of envelope 12 in relation to the density of the surrounding air and to maintain neutral buoyancy. In order to descend, the density of airship 10 is increased by pumping air into forward and aft ballonets 14A and 14B. Once again, the ambient air pressure increases and the lighter-than-air gas contained within envelope 12 contracts making room for the expansion of forward and aft ballonets 14A and 14B.

Gondola 18 is attached to a bottom side of envelope 12. It is enclosed, holds the passengers and crew, and contains the control panels. Propulsion system 20 is attached to gondola 18 and controls attitude and forward thrust when airship 10 is airborne. Propulsion system 20 comprises maneuver thrusters 22A and 22B, which are located on either side of gondola 18. (Maneuver thruster 22A is described in detail with respect to FIGS. 2a-4b. Maneuver thruster 22B functions similarly to maneuver thruster 22A.)

It should be understood that FIG. 1 is included to demonstrate the general structure of an airship and how it functions. The present invention is not limited to use with this particular vehicle embodiment. In fact, propulsion system 20 may be utilized with numerous airship designs. In addition, propulsion system 20 may also be used with a hybrid aircraft since a hybrid aircraft also includes an envelope and gets lift from a lighter-than-air gas, in addition to aerodynamic flow over a wing-shaped envelope.

FIGS. 2a-4b demonstrate how propulsion system 20 controls the attitude and thrust of an airship or hybrid aircraft when functioning in a maneuver thruster position. Shown is maneuver thruster 22A, which includes propeller 24, which is adjustable pitch, cowl 26 and motor 28. Also shown are pivot mechanism 30, pivot support arm 31, support members 32A-32D and airship wall 34. In addition, forward air valve 16A, forward ballonet duct 36 and mounting structure 38 are visible. The dashed line denotes horizontal pivot axis H and arrow F is oriented in the fore direction. (Maneuver thruster 22B is structurally identical to maneuver thruster 22A and is positioned adjacent rear air vent 16B (FIG. 1). Maneuver thruster 22B functions similarly to maneuver thruster 22A.)

In an exemplary embodiment, maneuver thruster 22A is positioned adjacent to forward air vent 16A and is attached to pivot 30 via pivot support arm 31. Pivot mechanism 30 defines horizontal pivot axis H, which is perpendicular with respect to the direction of flight of the airship or hybrid aircraft in a standard configuration. Pivot mechanism 30 allows the tilt of propeller 24 to be varied around horizontal pivot axis H, thus controlling the attitude (i.e. the inclination of the three principal axes of the vehicle relative to the ground) and thrust of the airship or hybrid aircraft. Propeller 24 has a range of motion around horizontal pivot axis H of about 180 degrees. As a result, the airship or hybrid aircraft can be pitched up, down or maneuvered at an angle, such as 45 degrees in an upward or downward direction. Pivot mechanism 30 can take a number of different forms, such as a shaft drive or a hinge driven by electric or hydraulic actuation. For instance, in an exemplary embodiment, rotation around horizontal pivot axis H may be electrically driven by a rotary-type actuator included within pivot mechanism 30. However, the present invention is not so limited and pivot mechanism 30 may be formed to rotate propeller 24 around horizontal pivot axis H in any suitable manner.

Pivot mechanism 30 is attached to mounting structure 38 via support members 32A-32D. As shown in FIGS. 2a-4b, mounting structure 38 is a latticework of tubing that is attached to airship wall 34 to spread out the weight of maneuver thruster 22A in order to reduce the risk of structural damage to the envelope. However, it should be understood that maneuver thruster 22A and pivot mechanism 30 may be attached to airship wall 34 in any suitable manner. In addition, it may be desirable that maneuver thruster 22A and pivot mechanism 30 are attached to a gondola or pod under the airship or hybrid aircraft.

Figure 2A:
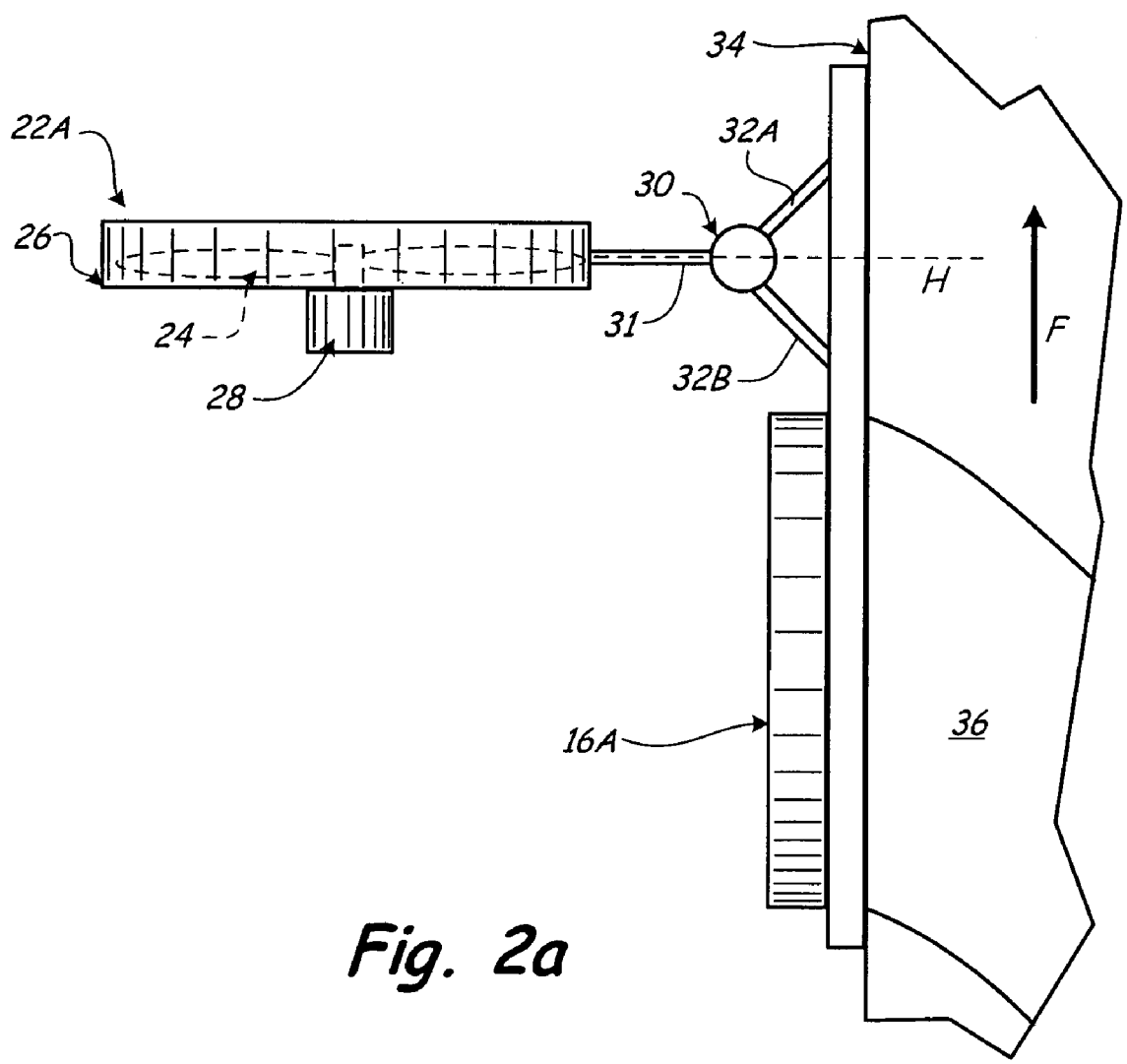
FIGS. 2a-2b are top plan and side views of a maneuver thruster positioned to provide an airship or hybrid aircraft with forward thrust so it moves forward in a straight line.
Figure 2B:
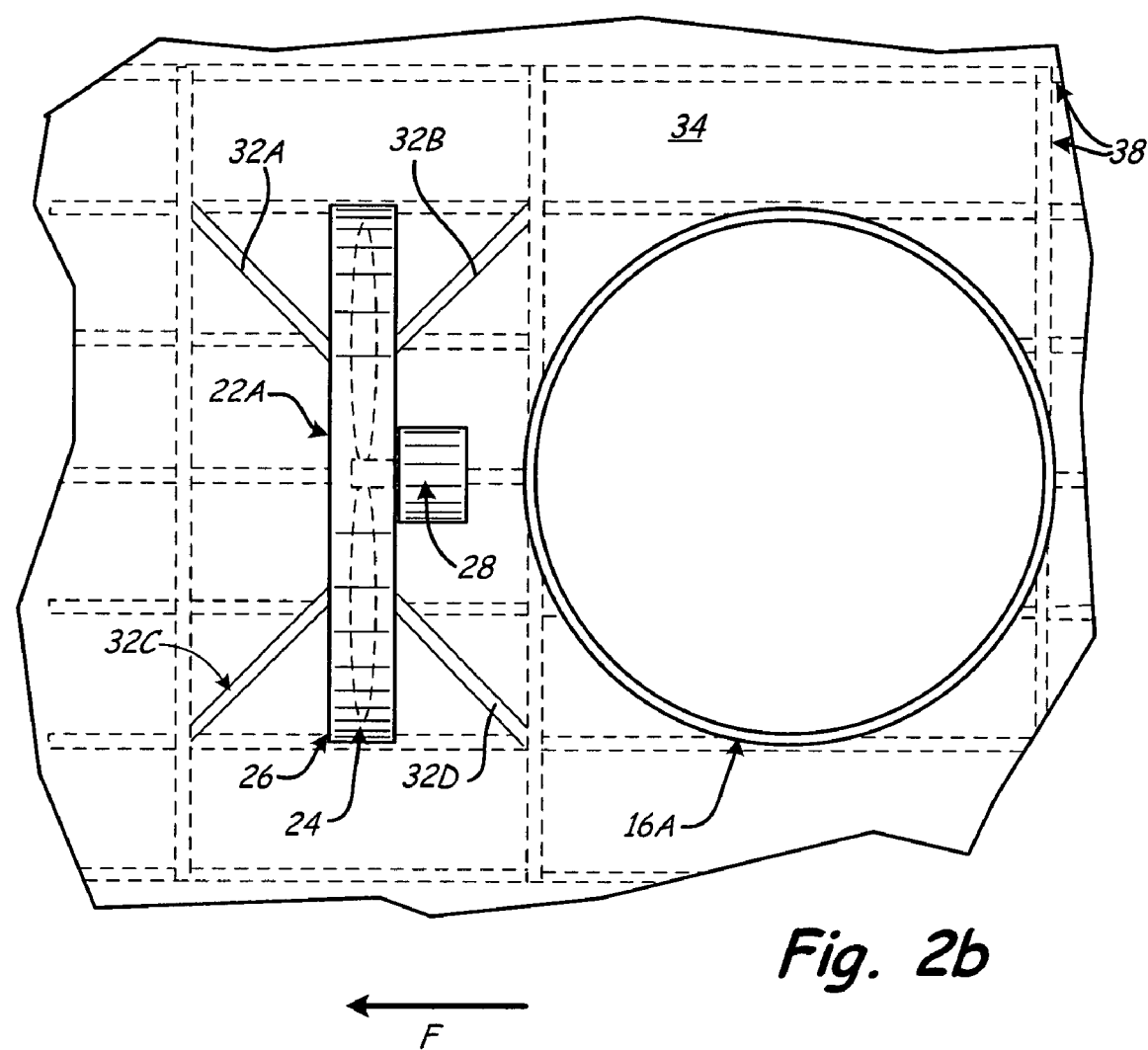

FIG. 2a is top plan view and FIG. 2b is a side view of maneuver thruster 22A positioned to provide forward thrust. In FIGS. 2a-2b, maneuver thruster 22A is positioned so that propeller 24 is oriented in the fore direction. As motor 28 turns propeller 24, air is blown directly backwards. As a result, the airship or hybrid aircraft will fly forward in a straight line when maneuver thruster 22A (and maneuver thruster 22B) is operating in the position shown in FIGS. 2a-2b.

Figure 3A:
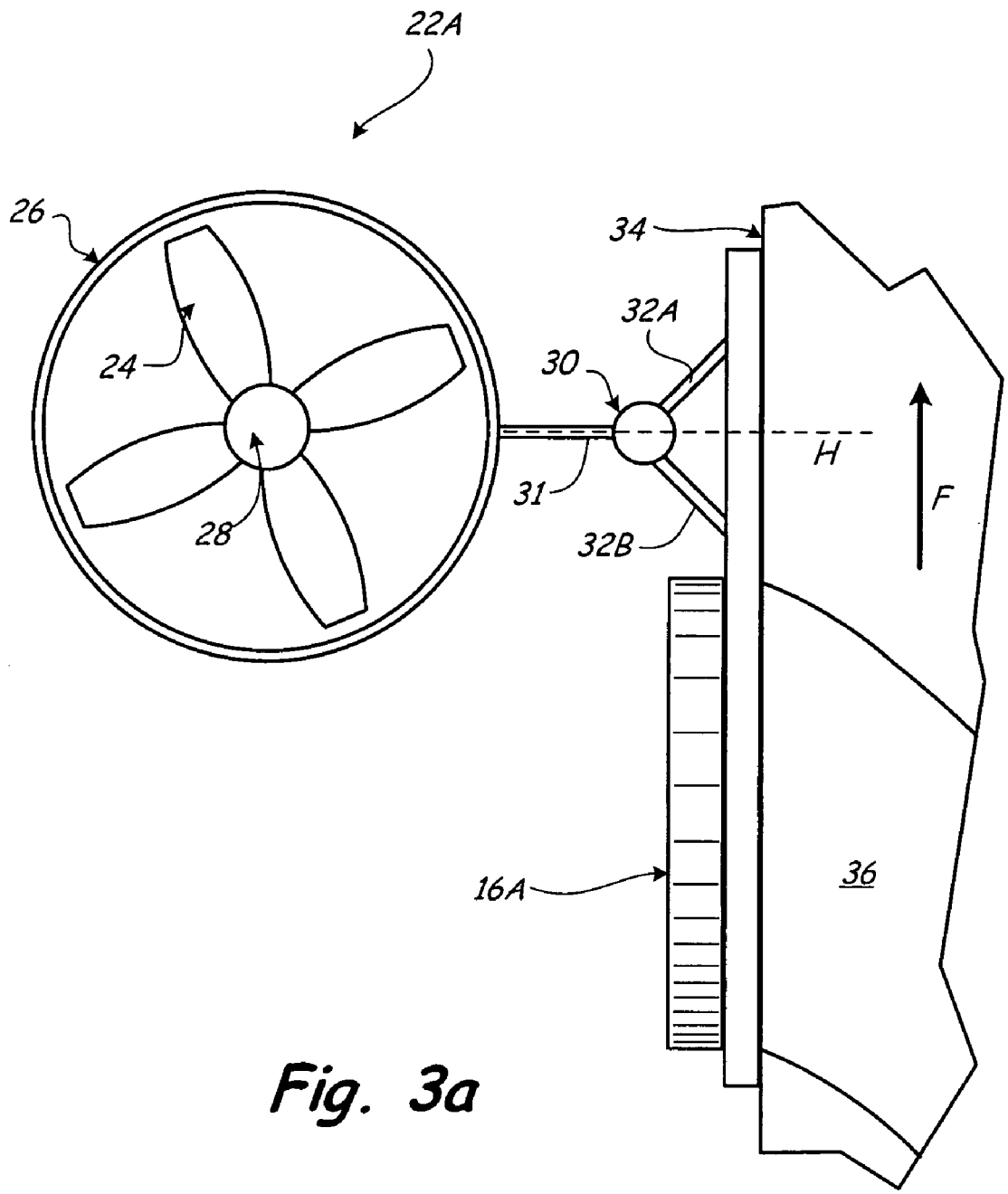
FIGS. 3a-3b are top plan and side views of the maneuver thruster positioned to pitch an airship or hybrid aircraft downward at about a 90 degree angle.
Figure 3B:
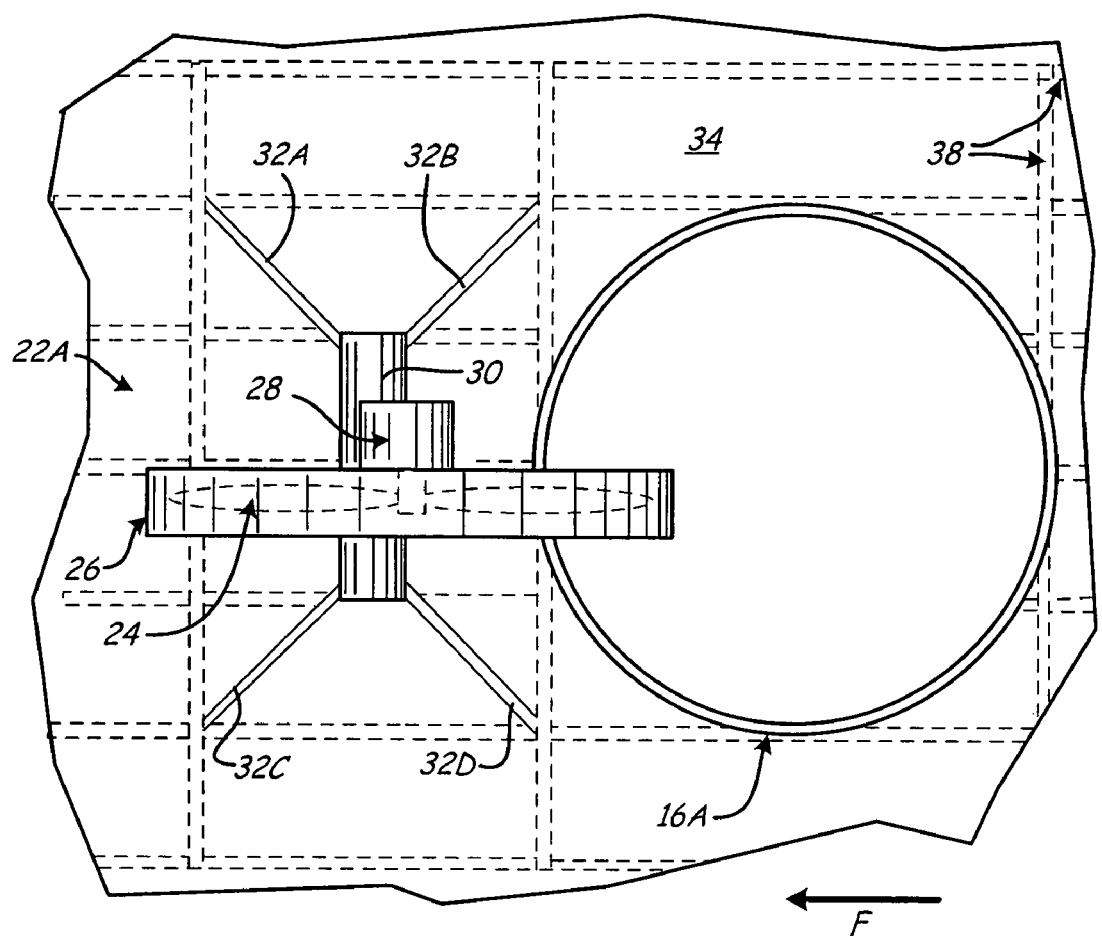

FIG. 3a is top plan view and FIG. 3b is a side view of maneuver thruster 22A positioned to provide downward thrust. In FIGS. 3a-3b, maneuver thruster 22A is positioned so that propeller 24 is oriented in a downward direction. As motor 28 turns propeller 24, air is blown directly upwards. As a result, the airship or hybrid aircraft will pitch down and descend when forward-mounted maneuver thruster 22A (and maneuver thruster 22B shown in FIG. 1) is operating in the position shown in FIGS. 3a-3b.

Figure 4A:
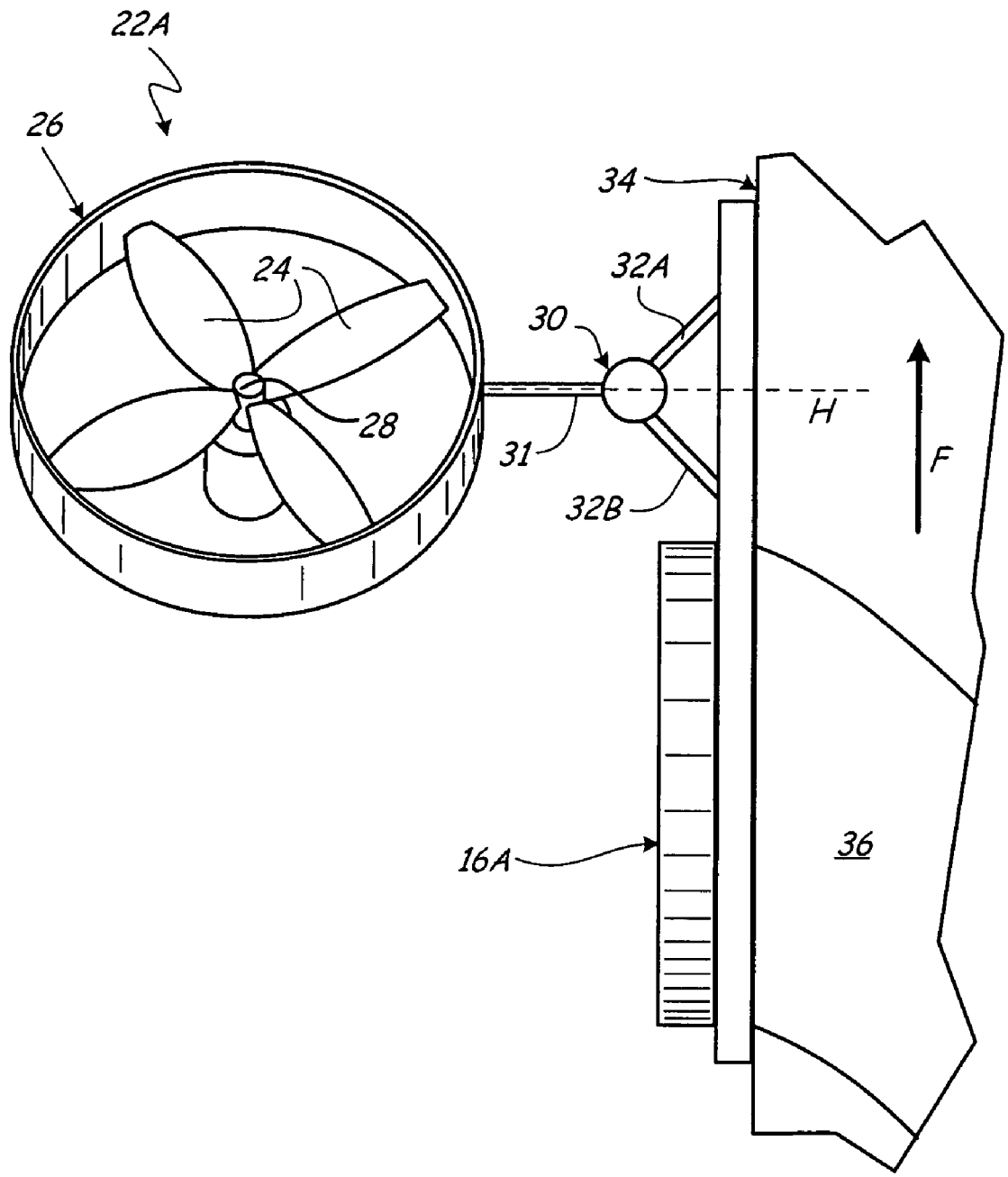
FIGS. 4a-4b are top plan and side views of the maneuver thruster positioned to pitch an airship or hybrid aircraft upward and move it forward at about a 45 degree angle.
Figure 4B:
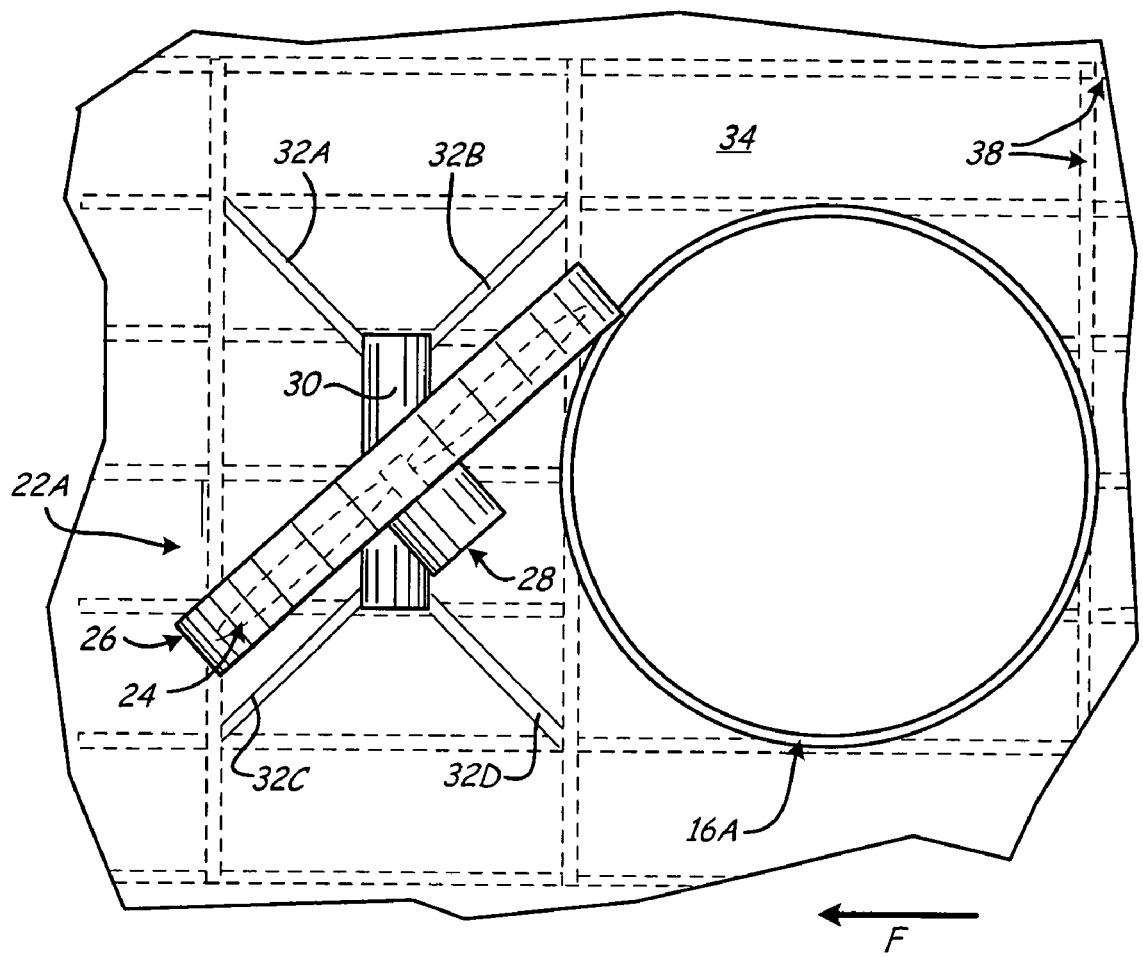

FIG. 4a is top plan view and FIG. 4b is a side view of maneuver thruster 22A positioned to provide forward and upward thrust. In FIGS. 4a-4b, maneuver thruster 22A is positioned so that propeller 24 is oriented at an angle in an upward direction. As motor 28 turns propeller 24, air is blown downwards in an aft direction. As a result, the airship or hybrid aircraft will pitch up and move forward when forward-mounted maneuver thruster 22A (and maneuver thruster 22B shown in FIG. 1) is operating in the position shown in FIGS. 4a-4b.

Figure 5A:
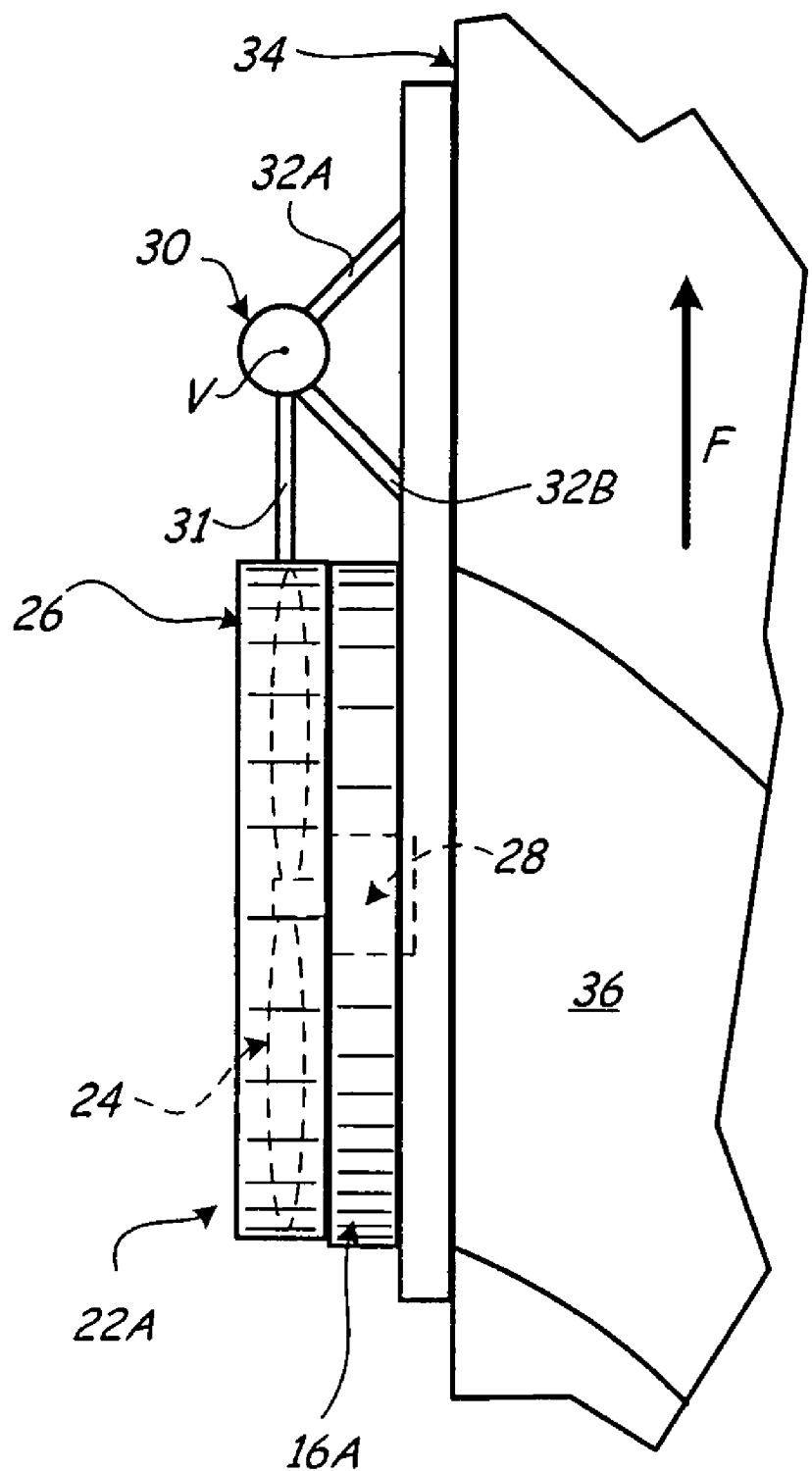
FIGS. 5A-5b are top plan and side views of the maneuver thruster positioned to inflate a ballonet in an emergency situation.
Figure 5B:
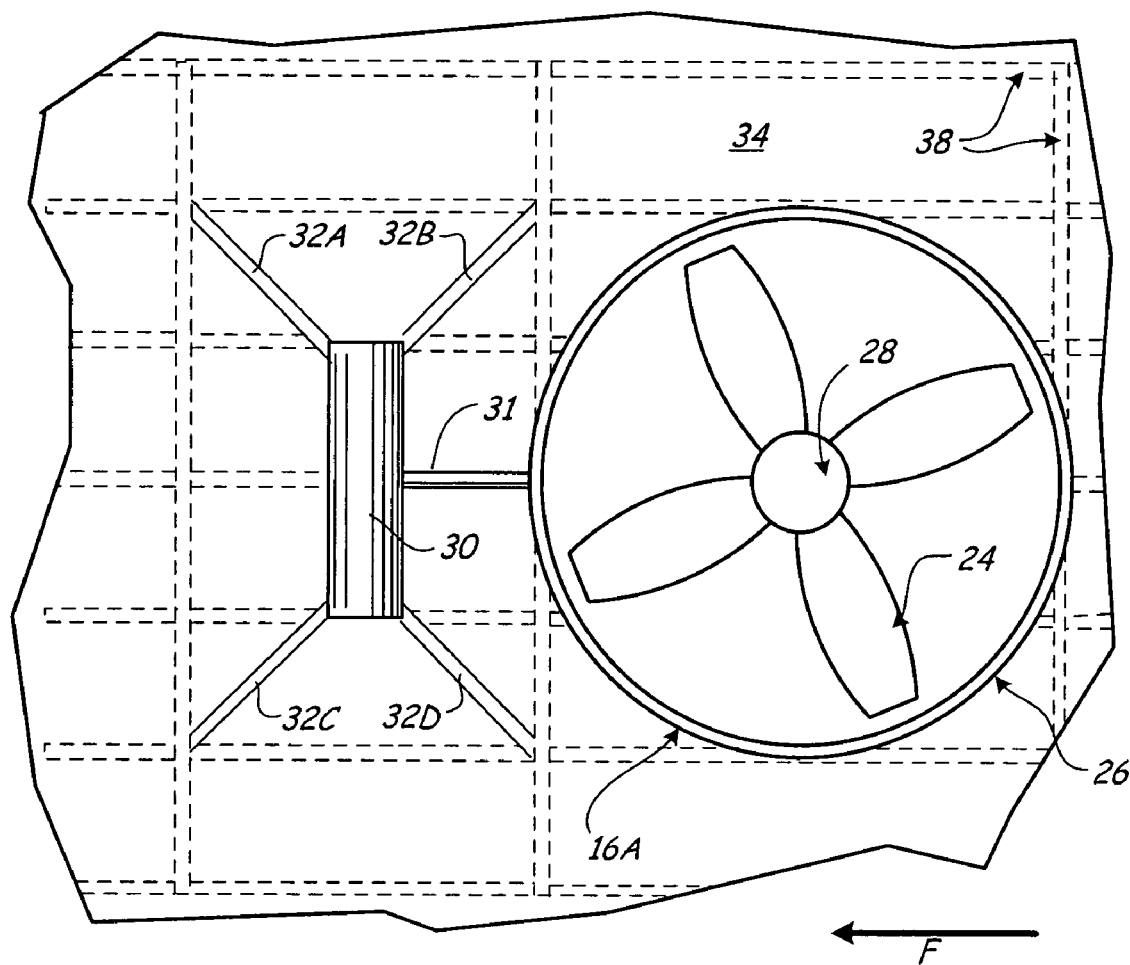

FIG. 5a is a top plan view and FIG. 5b is a side view of maneuver thruster 22A positioned to inflate a ballonet in an emergency situation. Shown is maneuver thruster 22A, which includes propeller 24, cowl 26 and motor 28. Also shown are pivot mechanism 30, pivot support arm 31, support members 32A-32D and airship wall 34. In addition, forward air valve 16A, forward ballonet duct 36 and mounting structure 38 are visible. The dashed line denotes vertical pivot axis V and arrow F is oriented in the fore direction.

In the exemplary embodiment shown in FIGS. 5a-5b, maneuver thruster 22A has been rotated from the thruster position described with reference to FIGS. 2a-4b to an emergency ballonet fill position. This is possible because pivot mechanism 30 also defines vertical pivot axis V, which is perpendicular with respect to the direction of flight of the airship or hybrid aircraft in a standard configuration. Propeller 24 has a range of motion around vertical pivot axis V of about 90 degrees. As a result, pivot mechanism 30 allows propeller 24 to pivot between the maneuver thruster position to the emergency ballonet fill position. As described with reference to FIGS. 2a-4b, pivot mechanism 30 can take a number of different forms, such as a shaft drive or a hinge driven by electric or hydraulic actuation. In an exemplary embodiment, movement between the maneuver thruster position and the emergency ballonet fill around vertical pivot axis V may be electrically driven by a hinge-type actuator included within pivot mechanism 30. However, the present invention is not so limited and pivot mechanism 30 may be formed to rotate propeller 24 around vertical pivot axis V in any suitable manner.

Under normal conditions, maneuver thruster 22A will be positioned to function as a maneuver thruster as described with reference to FIGS. 2a-4b. However, if an emergency situation arises, air will need to be pumped into the ballonets at a high rate in order to maintain the structural integrity of the envelope. For instance, if the airship of hybrid aircraft experiences a mechanical failure and begins to descend rapidly, the ambient air pressure will rise as the vehicle falls causing the envelope to collapse and potentially become damaged. Therefore, when this type of emergency descent situation is sensed, a controller will cause maneuver thruster 22A (and maneuver thruster 22B shown in FIG. 1) to pivot around vertical axis V. In response, maneuver thruster 22A will fold downward against airship wall 34 in alignment with forward air valve 16A. (Similarly, maneuver thruster 22B will fold downward against airship wall 34 in alignment with aft air valve 16B.)

When maneuver thruster 22A has been pivoted around vertical axis V into the emergency ballonet position, propeller 24 will be positioned at the inlet of forward air valve 16A. As motor 28 drives propeller 24, air is blown into forward air valve 16A into forward ballonet duct 36 at a high rate. As a result, forward ballonet 14A will inflate rapidly, thus controlling the pressure inside the envelope to maintain a balance between the rapidly increasing ambient air pressure and the effects of the contraction of the lighter-than-air gas.

In order to handle an emergency descent situation, the airflow from one or more of the propellers would be required to provide sufficient airflow into the ballonets, depending on the design of the vehicle and the size of the propellers. Since these propellers are sized to provide the required thrust for the airship or hybrid aircraft, only a small weight increase, associated with the added complexity of the pivot mechanism, is required to allow the propellers to function as emergency ballonet fans. This avoids the need for dedicated ballonet fan capacity of several times what is required for normal operation and the electrical power to drive the additional fans. For instance, under normal conditions, maximum electrical power usage for an exemplary airship or hybrid aircraft could be about 350 kilowatts. However, in the event of an emergency, such as descent at 1500 feet (457.2 meters) per minute, about 700 kilowatts of electrical power could be needed to power the ballonet fans alone.

The ability of the propulsion system of the present invention to function as emergency ballonet fans eliminates the need to provide separate emergency ballonet fans. The elimination of these large, heavy fans, which are seldom used, is cost efficient and also results in a reduction of the total weight of the airship or hybrid aircraft. In addition to avoiding the additional cost and weight of the emergency ballonet fans, the present invention may allow a significant reduction in the size and cost of the electrical generation and distribution system.

Although the present invention has been described with reference to preferred embodiments, workers skilled in the art will recognize that changes may be made in form and detail without departing from the spirit and scope of the invention.

The invention claimed is:

1. A propulsion system for an airship or a hybrid aircraft, the propulsion system comprising:
   a propeller; and
   a pivot mechanism connected to the propeller, wherein the pivot mechanism enables the propeller to pivot around a first pivot axis between a maneuver thruster position an an emergency ballonet fill position such that the propeller is folded against a wall of the airship or hybrid aircraft in alignment with an adjacent ballonet vent when in the emergency ballonet fill position.

2. The propulsion system of claim 1 wherein the first pivot axis is perpendicular with respect to a direction of flight of the airship or hybrid aircraft.

3. The propulsion system of claim 1 wherein the propeller has a range of motion around the first pivot axis of about 90 degrees.

4. The propulsion system of claim 1 wherein the propeller inflates a ballonet located within the airship or hybrid aircraft by generating airflow into the adjacent ballonet vent.

5. The propulsion system of claim 1 wherein the pivot mechanism enables the propeller to pivot around a second pivot axis when in the maneuver thruster position to control the attitude of the airship or hybrid aircraft.

6. The propulsion system of claim 5 wherein the second pivot axis is perpendicular with respect to a direction of flight of the airship or hybrid aircraft.

7. The propulsion system of claim 5 wherein the propeller has a range of motion around the second pivot axis of about 180 degrees.

8. The propulsion system of claim 1 wherein the pivoting mechanism comprises an electrically driven hinge-type actuator.

9. The propulsion system of claim 1 wherein the pivoting mechanism comprises an hydraulically driven hinge-type actuator.

10. A propulsion system for an airship or a hybrid aircraft, the propulsion system comprising:
    a first propeller;
    a second propeller;
    a first pivot mechanism connected to the first propeller, wherein the first pivot mechanism defines a first pivot axis around which the first propeller may rotate between a maneuver thruster position and an emergency ballonet fill position and a second pivot axis around which the first propeller may rotate to control the attitude of the airship of hybrid aircraft; and
    a second pivot mechanism connected to a second propeller, wherein the second pivot mechanism defines a third pivot axis around which the second propeller may rotate between a maneuver thruster position and an emergency ballonet fill position and a fourth pivot axis around which the second propeller may rotate to control the attitude of the airship of hybrid aircraft such that the first and second propellers are each disposed against a wall of the airship or hybrid aircraft in alignment with an adjacent ballonet vent when in the emergency ballonet fill position.

11. The propulsion system of claim 10 and further comprising a mounting structure attached to an outer wall of the airship or hybrid aircraft.

12. The propulsion system of claim 11 wherein the first and second pivot mechanisms each comprise a plurality of support arms for attachment to the mounting structure and a pivot arm for attachment to the propeller.

13. The propulsion system of claim 12 wherein the first and second pivot mechanisms each further comprise a first pivot drive for rotating the pivot arm around the first pivot axis and a second pivot drive for rotating the pivot arm around the second pivot axis.

14. The propulsion system of claim 13 wherein the first pivot drive comprises a hinge-type actuator and the second pivot drive comprises a rotary-type actuator.

15. The propulsion system of claim 10 wherein the first and third pivot axes are perpendicular with respect to a direction of flight of the airship or hybrid aircraft.

16. The propulsion system of claim 10 wherein the first and second propellers each have a range of motion around the first and third pivot axes, respectively, of about 90 degrees.

17. The propulsion system of claim 10 wherein the first and second propellers each inflate a ballonet located within the airship or hybrid aircraft by generating airflow into the adjacent ballonet vent.

18. The propulsion system of claim 10 wherein the second and fourth pivot axes are perpendicular with respect to a direction of flight of the airship or hybrid aircraft.

19. The propulsion system of claim 10 wherein the first and second propellers each have a range of motion around the second and fourth pivot axes, respectively, of about 180 degrees.

20. A method of utilizing a propulsion system for an airship or hybrid aircraft in an emergency decent situation, the method comprising:
   sensing an emergency descent situation;
   pivoting a propeller from a maneuver thruster position to an emergency ballonet fill position adjacent a ballonet vent;
   driving the propeller to generate airflow into the adjacent ballonet vent to inflate a ballonet located inside the airship or hybrid aircraft to reduce a rate of descent.

* * * * *

UNITED STATES PATENT AND TRADEMARK OFFICE
CERTIFICATE OF CORRECTION

| | | |
|---|---|---|
| PATENT NO. | : 7,871,035 B2 | Page 1 of 1 |
| APPLICATION NO. | : 11/786158 | |
| DATED | : January 18, 2011 | |
| INVENTOR(S) | : David V. Arel | |

It is certified that error appears in the above-identified patent and that said Letters Patent is hereby corrected as shown below:

Col. 6, Line 9
    Delete "an"
    Insert --and--

Signed and Sealed this
Fifth Day of April, 2011

David J. Kappos
*Director of the United States Patent and Trademark Office*